Figure 1:
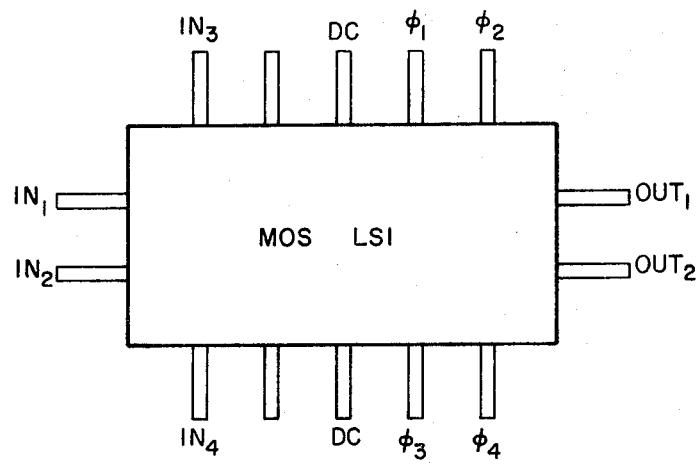

United States Patent [19]
Griffin

[11] 3,736,506
[45] May 29, 1973

[54] METHOD OF TESTING INTEGRATED CIRCUITS

[75] Inventor: Ronald G. Griffin, Costa Mesa, Calif.

[73] Assignee: Collins Radio Company, Dallas, Tex.

[22] Filed: Feb. 26, 1971

[21] Appl. No.: 119,317

[52] U.S. Cl. ............. 324/158 R, 29/574, 324/158 D
[51] Int. Cl. ............................................. G01r 31/26
[58] Field of Search ................... 324/158 R, 158 D, 324/158 T, 73 R; 29/569, 574, 584, 585, 586

[56] References Cited

UNITED STATES PATENTS

| | | | |
|---|---|---|---|
| 2,810,951 | 10/1957 | Boynton et al. | 29/569 |
| 2,894,313 | 7/1959 | Stineman, Jr. et al. | 29/574 |
| 1,916,364 | 7/1933 | Du Mont | 324/158 R |

OTHER PUBLICATIONS

Harm, R. S.; "A Look At..."; Solid State Technology; Sept. 1969; pp. 42–46.

Gutierrez et al.; "TFT Instability..."; Solid State Technology; May 1968; pp. 33–39.

*Primary Examiner*—Rudolph V. Rolinec
*Assistant Examiner*—Ernest F. Karlsen
*Attorney*—Henry K. Woodward and Robert J. Crawford

[57] ABSTRACT

An economical method for life testing complex integrated circuit arrays including numerous internal nodes and requiring a variety of input signal combinations, including in combination with requisite clocking signals the use of one or more ramp voltages as input signals.

4 Claims, 2 Drawing Figures

PATENTED MAY 29 1973 3,736,506

(a)

(b)

(c)

INVENTOR
RONALD G. GRIFFIN
BY  H. K. Woodward
ATTORNEY

METHOD OF TESTING INTEGRATED CIRCUITS

This invention relates generally to semiconductor integrated circuits, and more particularly to large scale integrated circuits and to a method for "burning in" or electrically exercising such integrated circuits to assure circuit reliability.

The semiconductor industry has long recognized the desirability and need for electrically exercising semiconductor devices in order to identify short lived devices and thus improve circuit reliability. Such testing has been variously referred to as power aging, burn-in testing, and life testing.

With conventional bipolar discrete devices and low complexity digital bipolar integrated circuits, this electrical exercising is readily accomplished by providing one or more d.c. biases, as required, to each device while it is in an oven at an elevated temperature. This serves to stress P-N junctions and device metalization systems, and accelerate surface effect failure modes.

The increased complexity of integrated circuits has been accelerated by the use of field effect transistors, and more specifically MOS transistors, which lend themselves to highly complex large scale integration. MOS LSI introduces new failure mode emphasis, primarily oxide contamination and increased surface state sensitivity. Thus the need for power aging of such devices is particularly accute.

Heretofore, most burn-in processes have been accomplished by supplying requisite clock signals and providing a d.c. bias to the device input. Such a process does provide adequate testing for discrete devices or simple integrated arrays; however, with the more complex MOS LSI arrays such processing is only partially satisfactory in exercising the internal circuit nodes. The problem arises because of the various possible circuit input combinations, many of which are not exercised, and the resulting activated pattern through the array remains static. Attempting to supply multiple input signals to many different circuit designs often being simultaneously burned in, would be a formidable logistics problem and prohibitive in cost.

An object of the invention is a method for effectively electrically exercising a semiconductor integrated circuit.

Another object of the invention is a method for electrically exercising an integrated circuit which is relatively economical. Features of the inventive process include the use of required clocking inputs and at least one ramp voltage for the circuit input, the frequency of the ramp voltage being substantially less than the frequencies of said clocking inputs (e.g., at least an order of magnitude less than the lowest clock frequency), with the ramp voltage cycling independently of said clocking signals.

Figure 2:
Figure 2:
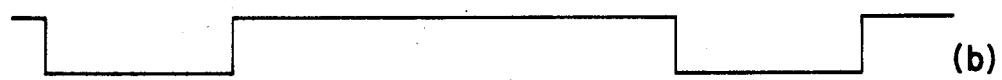
Figure 2:
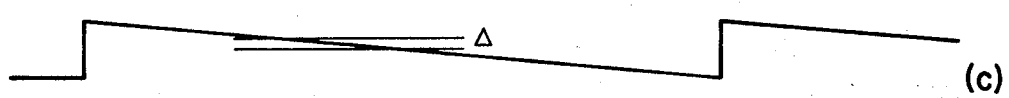

These and other objects and features of the invention will be apparent from the following detailed description and appended claims, when taken with the drawing, in which:

FIG. 1 is an illustrative view of a packaged integrated circuit with which the present invention is useful, and FIG. 2 is waveforms of illustrative signal inputs used in life testing integrated circuits.

Referring now to the drawing, FIG. 1 is an illustrative view of a packaged integrated circuit with which the present invention is applicable. The circuit may be, for example, a metal oxide semiconductor large scale integrated array including a large number of internal logic elements (NAND gates for example). As shown, the circuit includes four input terminals ($IN_1$–$IN_4$), two d.c. bias terminals, four clock terminals ($\phi_1$–$P_4$), and two output terminals ($OUT_1$–$OUT_2$). Such a circuit may comprise a register, memory, and/or converter. Heretofore, the circuit would be partially burned in by providing the suitable clocking signals, such as shown in FIG. 2a, and d.c. biases with the input terminals grounded. Alternatively, the input terminals may be provided with a repetitious pulse input, such as shown in FIG. 2b, which can improve the burn-in or life testing.

As above described, however, many of the internal nodes of the integrated circuit array will not be exercised with this burn-in process. Ideally, completely random pulse inputs will be provided to the input terminals of the circuit. However, provision of such random inputs would be expensive if not prohibitive in cost.

In accordance with the present invention, the clocking signals and bias voltages are provided to the circuit along with a ramp generator voltage such as shown in FIG. 2c. No correlation in time scale is intended in FIGS. 2a, 2b, and 2c, as the frequency of the ram voltage is preferably substantially less than the frequencies of said clock signals, for example, at least one order of magnitude slower than the lowest clock frequency. Further, the ramp voltage is preferably cycled independently of said clock signals, i.e., there is no phase or frequency correlation between the signals.

Since the threshold voltages of MOS devices vary slightly between devices, as shown by the differential voltage, $\Delta$, in FIG. 2c, various threshold combinations in conjunction with the clocking signals will be applied to the circuit inputs, thereby providing a wide variety of input combinations to the circuit under test. Further, when a number of circuits are to be tested concurrently, a plurality of ramp voltages, themselves being neither of the same frequency nor dependently cycled, may be provided to offer a still wider variety of input combinations.

In one embodiment of the invention utilizing four clock signals and four input signals for exercising a MOSFET array, the phased clock signals are provided at 192 KHz with rise and fall times of 300 nanoseconds; and the four input ramp signals have frequencies of 110 Hz, 135 Hz, 40 Hz, and 29 Hz, respectively.

The disclosed process for electrically exercising large scale integrated semiconductor arrays has proved to be economical while also allowing expanded assurance of circuit burn-in. While the invention has been described with reference to specific embodiments, the description is illustrative and not to be construed as limiting the scope of the invention. Various modifications and changes may occur to those skilled in the art without departing from the spirit and scope of the invention as defined by the appended claims.

I claim:

1. The method of electrically exercising a semiconductor integrated circuit array having a plurality of signal inputs and at least one clocking input comprising the steps of applying a clock signal to said clocking input and applying a ramp voltage signal to said plurality of signal inputs, the frequency of said ramp voltage being substantially less than the frequency of said clock signal and said ramp voltage cycling independently of said clock signal.

2. The method defined by claim 1 wherein said array comprises a plurality of field effect transistors.

3. The method defined by claim 1 wherein a plurality of ramp voltages are applied to said signal inputs, said ramp voltages having different frequencies and cycling independently of each other and of said clock signal.

4. The method defined by claim 3 wherein said array includes a plurality of clocking inputs and said ramp voltage is substantially less than the lowest frequency of said clock signals and said ramp voltage is cycled independently of said clock signals.

* * * * *

UNITED STATES PATENT OFFICE
CERTIFICATE OF CORRECTION

Patent No. 3,736,506            Dated May 29, 1973

Inventor(s) RONALD G. GRIFFIN

It is certified that error appears in the above-identified patent and that said Letters Patent are hereby corrected as shown below:

Column 2, line 4, delete "$\phi_1$-$P_4$" and substitute therefor --$\phi_1$-$\phi_4$--;

Column 4, line 4, delete "is" and insert --frequencies are--; and

Column 4, line 3, delete "voltage is" and substitute therefor --voltages are--.

Signed and sealed this 20th day of November 1973.

(SEAL)
Attest:

EDWARD M. FLETCHER, JR.
Attesting Officer

RENE D. TEGTMEYER
Acting Commissioner of Patents